(12) United States Patent
Cooke et al.

(10) Patent No.: US 9,599,695 B2
(45) Date of Patent: Mar. 21, 2017

(54) OBJECT LOCATION AND TRACKING

(71) Applicant: Maxwell Forest Pty Ltd, Toorak VIC (AU)

(72) Inventors: Matthew Emmett Cooke, Sydney (AU); Anthony Mark Schofield, Sydney (AU)

(73) Assignee: Maxwell Forest PTY LTD (AU)

( * ) Notice: Subject to any disclaimer, the term of this patent is extended or adjusted under 35 U.S.C. 154(b) by 31 days.

(21) Appl. No.: 14/251,496

(22) Filed: Apr. 11, 2014

(65) Prior Publication Data

US 2014/0218238 A1  Aug. 7, 2014

Related U.S. Application Data

(63) Continuation of application No. PCT/IB2012/002489, filed on Oct. 16, 2012.
(Continued)

(51) Int. Cl.
*G01S 1/00* (2006.01)
*G01S 1/08* (2006.01)
(Continued)

(52) U.S. Cl.
CPC ............. *G01S 1/042* (2013.01); *G01S 1/68* (2013.01); *G08B 13/1427* (2013.01); *G08B 21/023* (2013.01); *G08B 21/025* (2013.01); *G08B 21/0222* (2013.01); *G08B 21/0261* (2013.01); *H04W 4/021* (2013.01); *H04W 4/028* (2013.01); *G08B 21/0213* (2013.01); *G08B 21/0236* (2013.01); *G08B 21/0269* (2013.01); *G08B 21/043* (2013.01); *G08B 21/0446* (2013.01); *H04W 64/00* (2013.01)

(58) Field of Classification Search
CPC .................................. G01S 1/02; G01S 1/245
USPC .... 342/385, 386, 463–465; 455/456.1, 456.2
See application file for complete search history.

(56) References Cited

U.S. PATENT DOCUMENTS 8,026,814 B1    9/2011  Heinze et al.
2002/0196151 A1  12/2002  Troxler
(Continued)

FOREIGN PATENT DOCUMENTS

WO    WO 02/073562 A1    9/2002
WO    WO 03/060847 A1    7/2003
WO    WO 2012/122607 A1   9/2012

OTHER PUBLICATIONS

European Patent Office, Search Report and Opinion, European Patent Application No. 12841597.3, Jul. 7, 2015, nine pages.
(Continued)

*Primary Examiner* — Dao Phan
(74) *Attorney, Agent, or Firm* — Fenwick & West LLP (57) ABSTRACT

A method for tracking an object includes associating a beacon with a responder; transmitting a polling signal from the beacon to the responder; receiving a response from the responder; entering a low power state on the beacon for a predetermined duration; and transmitting an alert from the beacon responsive to a subsequent signal from the beacon failing to result in receiving a subsequent response from the responder. Embodiments also include a system in which the beacon and responder are configured to perform the described functions. In various embodiments, the duration during which the beacon remains in the low power state is predetermined based either on a default factory setting or a user adjustable setting.

17 Claims, 12 Drawing Sheets

Related U.S. Application Data (60) Provisional application No. 61/547,729, filed on Oct. 16, 2011.

(51) Int. Cl.
| | |
|---|---|
| *G01S 3/02* | (2006.01) |
| *G01S 1/04* | (2006.01) |
| *G01S 1/68* | (2006.01) |
| *G08B 13/14* | (2006.01) |
| *H04W 4/02* | (2009.01) |
| H04W 64/00 | (2009.01) |
| G08B 21/02 | (2006.01) |
| G08B 21/04 | (2006.01) |

(56) References Cited

U.S. PATENT DOCUMENTS

| | | |
|---|---|---|
| 2010/0219967 A1 | 9/2010 | Kaufmann |
| 2011/0072132 A1 | 3/2011 | Shafer et al. |

OTHER PUBLICATIONS

PCT International Search Report and Opinion, PCT Application No. PCT/IB2012/002489, Apr. 15, 2013, eleven pages.

OBJECT LOCATION AND TRACKING

CROSS-REFERENCE TO RELATED APPLICATIONS

This application is a continuation application of international application PCT/IB2012/002489, filed Oct. 16, 2012, which claims the benefit of U.S. provisional application 61/547,729, filed on Oct. 16, 2011. The international application and the provisional application are incorporated by reference herein in their entirety.

BACKGROUND

Field

Described embodiments relate generally to object location and tracking, and optimization of power usage in an object location and tracking system.

Description of the Related Art

An object that has gone missing can be expensive, upsetting and inconvenient to recover. Some conventional product locators use GPS as the primary means of location determination. However, GPS location determination is energy intensive and as a result these products are typically large and heavy so that they can accommodate the large battery requirement of an energy-intensive device. Despite their size, they tend to have relatively short battery life.

SUMMARY

Described embodiments include a method for tracking an object by associating a beacon with a responder; transmitting a polling signal from the beacon to the responder; receiving a response from the responder; entering a low power state on the beacon for a predetermined duration; and transmitting an alert from the beacon responsive to a subsequent signal from the beacon failing to result in receiving a subsequent response from the responder. Embodiments also include a system in which the beacon and responder are configured to perform the described functions. In various embodiments, the duration during which the beacon remains in the low power state is predetermined based either on a default factory setting or a user adjustable setting.

Entering a low power state on the beacon decreases its energy requirements. Decreasing the energy requirements enables the device to operate for longer periods of time between charging or battery replacement and enables smaller devices with smaller batteries to be used.

In various embodiments, an alert is transmitted from the beacon via a communication network. This alert signal is transmitted using a communication protocol such Wi-Fi, WiMAX, UMTS, LTE or other wireless network. The alert in various embodiments includes a location message indicating, for example, the identity of the beacon, the identity of the responder and the location of the beacon. The beacon calculates the location in various embodiments using a network-based, SIM-based, device-based or hybrid method. Using location determination only after failing to receive the subsequent response and when preparing to transmit the alert obviates unnecessary location determination being performed when it is not necessary to determine that the object is safe, and therefore decreases the energy needs of the device.

In another embodiment, the beacon transmits an alert after a period determined from the recent history of success or failure of the polling and other measures of the radio propagation environment thus accommodating a dynamically evolving radio propagation environment. For example, a failure followed by two successful attempts may not trigger an alert, while four failures followed by a single success may trigger an alert. In one embodiment a sensitivity setting adjusts a number of failures that trigger an alert.

The signals from the beacon in one embodiment include a beacon identifier and a responder identifier and the response from the responder includes the responder identifier, the beacon identifier and a beacon synchronization message. In embodiments including multiple responders, such as a beacon with a further responder, the beacon transmits the alert after a predetermined period during which the beacon fails to receive subsequent response from either the responder or the further responder in response to polling.

In one embodiment, the responder enters a low power state and exits the low power state at a time before the beacon is scheduled to next poll. In various embodiments, the duration during which the responder remains in the low power state is predetermined based either on a default factory setting or a user adjustable setting.

In various embodiments, the polling period is adapted based on the recent history of success or failure of the polling or other measures of the radio environment including relative signal strength and bit error rate.

In various embodiments the beacon and responder are associated with one another in response to receipt of a signal over a communication network. The signal is received using a communication protocol such Wi-Fi, WiMAX, UMTS, LTE or other wireless network.

In various embodiments the beacon receives a message that provides an instruction to send an alert; and the beacon sends an alert in response to the message. The instruction to send an alert can be received from the responder, or from another device via a communication network.

In various embodiments, the response from the responder includes a beacon synchronization message and the predetermined duration is determined from the synchronization message.

In various embodiments the alert is transmitted from the beacon if a predetermined number of subsequent signals fail to result in receiving any subsequent response from the responder.

Various embodiments include a computer program product stored on a non-transitory computer readable medium with instructions that when executed cause a processor to execute the various steps described here.

DETAILED DESCRIPTION

In the embodiments described below, like reference numerals refer to like parts or steps. The embodiments are described in the context of dog tracking and construction worker tracking system but the present invention is equally applicable to tracking objects such as people, boats, shipping containers, artworks and other valuable assets.

Figure 1:
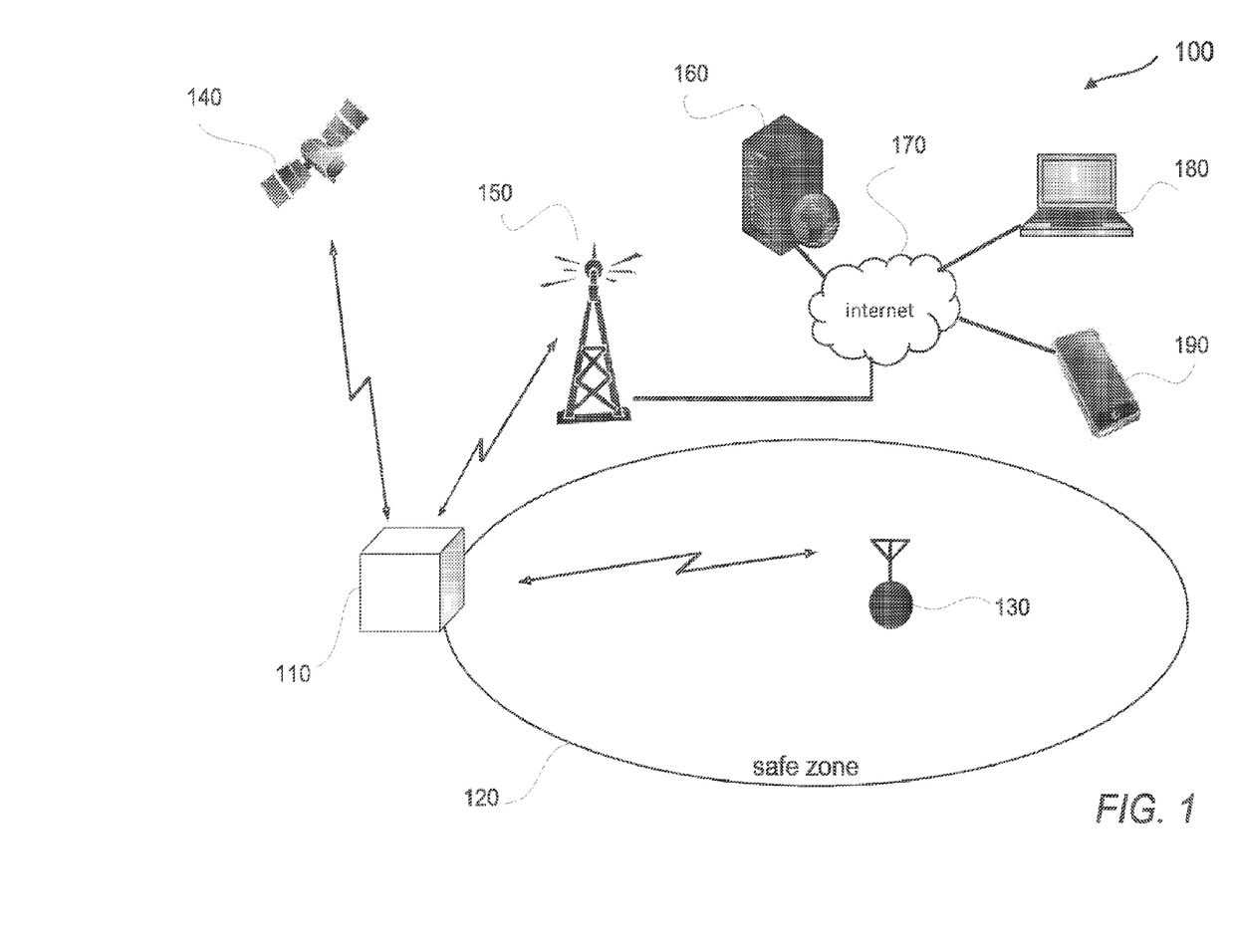
FIG. 1 illustrates a conceptual overview of a tracking system in accordance with one embodiment.

With reference to FIG. 1, a tracking system 100 has a responder 130 that emits a radio signal and defines a safe zone 120 where the relative signal strength of the radio signal is above a predefined level. An object beacon 110 is operable to communicate with the responder 130. The object beacon 110 is operable to calculate its position from a wireless location system including but not limited to GPS satellite network 140 or a cellular network 150 and communicate with a cellular network 150. To download configuration data and status queries and upload status information, the object beacon 110 communicates with a server 160 that is connected to a wide area network such as the Internet 170 using the cellular network 150. The beacon utilizes one or more available protocols such as Wi-Fi, WiMAX, UMTS, LTE or other wireless network to connect to the Internet 170. Applications such as web browsers or dedicated applications on a computer 180 or phone 190 can communicate with the server 160 to configure and query the status of the object beacon 110 and the responder 130.

When the object beacon 110 moves beyond the safe zone 120 and can no longer receive responses from the responder 130, the beacon determines its current location using the GPS satellite network and then transmits the current location as a status update to the server 160. The server 160 then notifies the owner or other nominated party such as security company via SMS, e-mail, push notification or other communication method that the object beacon 110 is no longer within a designated safe zone 120. The owner can then use the web browser or the dedicated application on the computer 180 or the phone 190 to view information including, in one embodiment, a map displaying the last transmitted location of the object beacon 110, or by another location identification mechanism such as a distance bearing from the owner. While the object beacon 110 is beyond the safe zone 120, the object beacon 110 determines its position and uploads it to the server 160 at intervals dynamically adjusted to maximize battery life until the object beacon 110 is back within a safe zone 120 or the object beacon 110 receives a configuration message from the server 160 to no longer send position updates, or by a preset amount of time. The object beacon 110 polls the server 160 to receive configuration information or queries. The polling of the server 160 occurs at regular configurable intervals and can also be triggered manually on the object beacon 110.

Figure 2A:
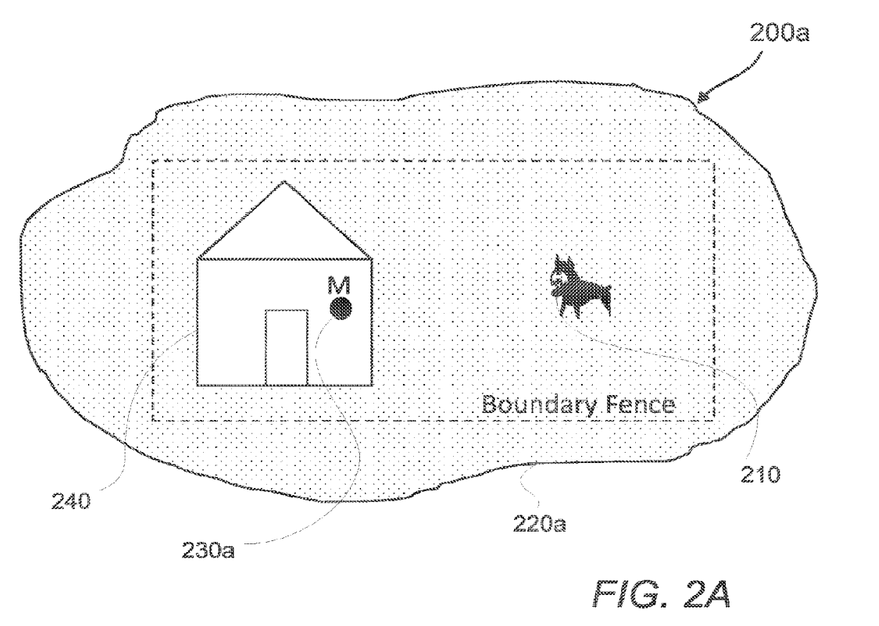
FIG. 2A shows a conceptual diagram of a stationary responder according to one embodiment.
Figure 2B:
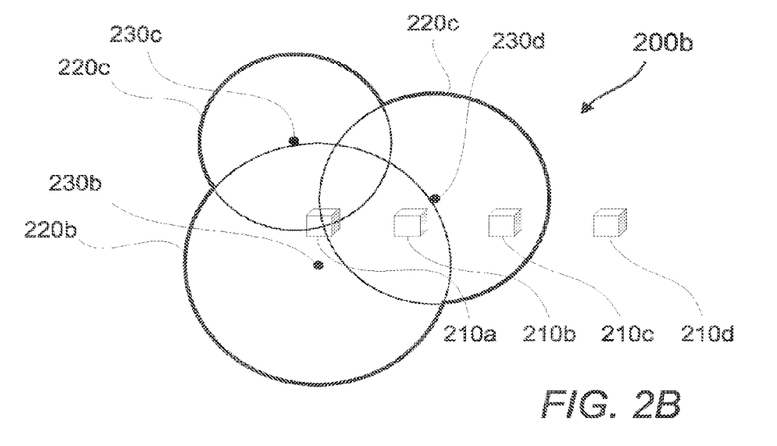
FIG. 2B shows a conceptual diagram of a multiple responder tracking system in accordance with one embodiment.
Figure 2C:
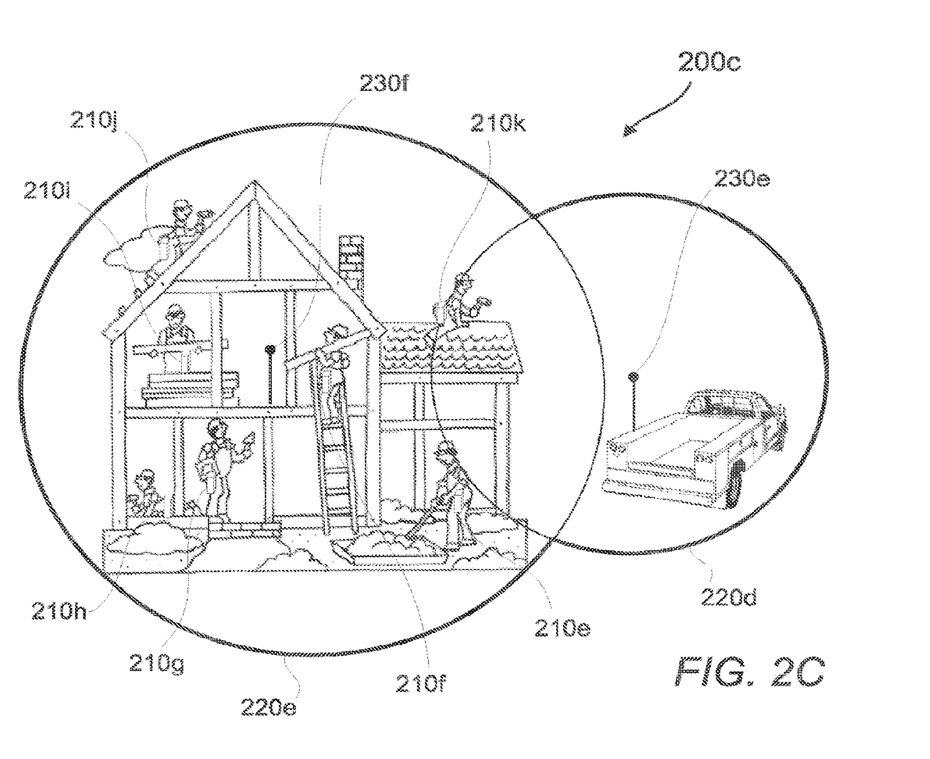
FIG. 2C shows a conceptual diagram of a multiple responder in a construction worker tracking system in accordance with one embodiment.

With reference to FIGS. 2A, 2B and 2C, different embodiments of a tracking system 200a, 200b, 200c, can have one responder, or more than one responders, in different forms such as a fixed or mobile responders. These embodiments have a beacon 210 and the safe zone 220 is defined by the margins of reception with a responder 230. In FIG. 2A one responder 230a is attached to a house 240.

In FIG. 2B a tracking system 200b has multiple responders 230b, 230c and 230d have overlapping safe zone 220b, 220c and 220d—the union of which defines a safe zone 220. Each of the responders 230b, 230c and 230d is paired with the object beacon 210. The beacon moves through the safe zone 220 illustrated with the object in a first position 210a, in a second position 210b, in a third position 210c, in a fourth position 210d. In the first position 210a the object beacon receives signals from each of the responders 230b, 230c and 230d. In the second position 210b the object beacon receives signals from two of the responders 230b and 230d. In the third position 210c the object beacon can only receive a signal from one responder 230d. In the fourth position 210d the object cannot receive a response from any of the paired responders 230b, 230c and 230d.

In an embodiment including a mobile responder, the safe zone is easily relocated to account for intended movement of the tracked object. For example, in the context of pet ownership, when a pet is away from home (for example when a dog is being taken for a walk), the pet remains within a moving safe zone around a mobile responder. The extent of the safe zone is configurable by adjusting the power of the responder or the relative signal strength or other radio propagation environment measure at which a response is generated.

FIG. 2C illustrates the use of a mobile responder in the construction industry. A construction zone has a safety tracking system 200c that has a safe zone 220 defined by the margins of transmission from a truck responder 230e producing a safe zone 220d and a construction site responder 230f. A construction worker has attached to their body a safety beacon 210. Construction workers performing various tasks are protected by safety beacons 210e, 210f, 210g, 210h, 210i, 210j and 210k. The safety beacons in various embodiments include accelerometers or other orientation-determining devices and can also provide addition safety features such as an orientation sensor that enables a man down capability whereby if the beacon 210 is in a predetermined orientation for a predetermined period a the beacon 210 will automatically start determining its position using GPS and transmitting the position to the central server raising a man down alert. In one embodiment, the man down alert is only triggered when nominated beacons are in range. For example, on the construction site, the construction site responder 230f would have to be in range for a man down alert to be raised. This prevents the beacon 210 raising an alarm if it was taken off and, for example, left on the seat of the truck when the construction worker went home.

Another application enables the protection of valuables in storage and high value items such as paintings and artwork often stored for long periods. A beacon is attached to the valuables. Fixed position responders are fixed to the storage facility, home and other locations where the tracked item is allowed to be located. Mobile responders are attached to the key ring of the owner. This allows movement of the valuables between storage and home without raising an alarm.

An unauthorized move will move the beacon outside the safe zone defined by the responders and an alarm will be raised.

Another embodiment involves boat security. Boats are typically moored or berthed at marinas and left for prolonged periods between authorized uses. It is useful to know if an unauthorized use takes place, or to log when a boat leaves or arrives back to the marina. A fixed responder is attached to the marina. A beacon is attached to the boat. If the boat goes out of range of the zone defined by the responder, then an alarm is raised. Authorized user can have a second responder attached to the keys of the boat to allow authorized use of the boat without raising an alarm.

Another embodiment relates to boat safety. Crew members can fall off boats. In this embodiment a boat responder is attached to the boat. A crew beacon is worn by each crew member. If a crew member falls overboard then the crew beacon exits the safe zone defined by the boat responder and an alarms is raised with each crew member. This provides a faster rescue response than an EPRB—(Emergency Personal Radio Beacon) facilitated rescue as the boat crew is alerted immediately. In one embodiment the crew beacon also incorporates an EPRB as a secondary alert mechanism.

In various embodiments, beacon 210 automatically starts determining its position using GPS and transmitting the position to the central server when it does not receive a response from any of the paired responders 230 after a predetermined number of attempts.

Figure 3:
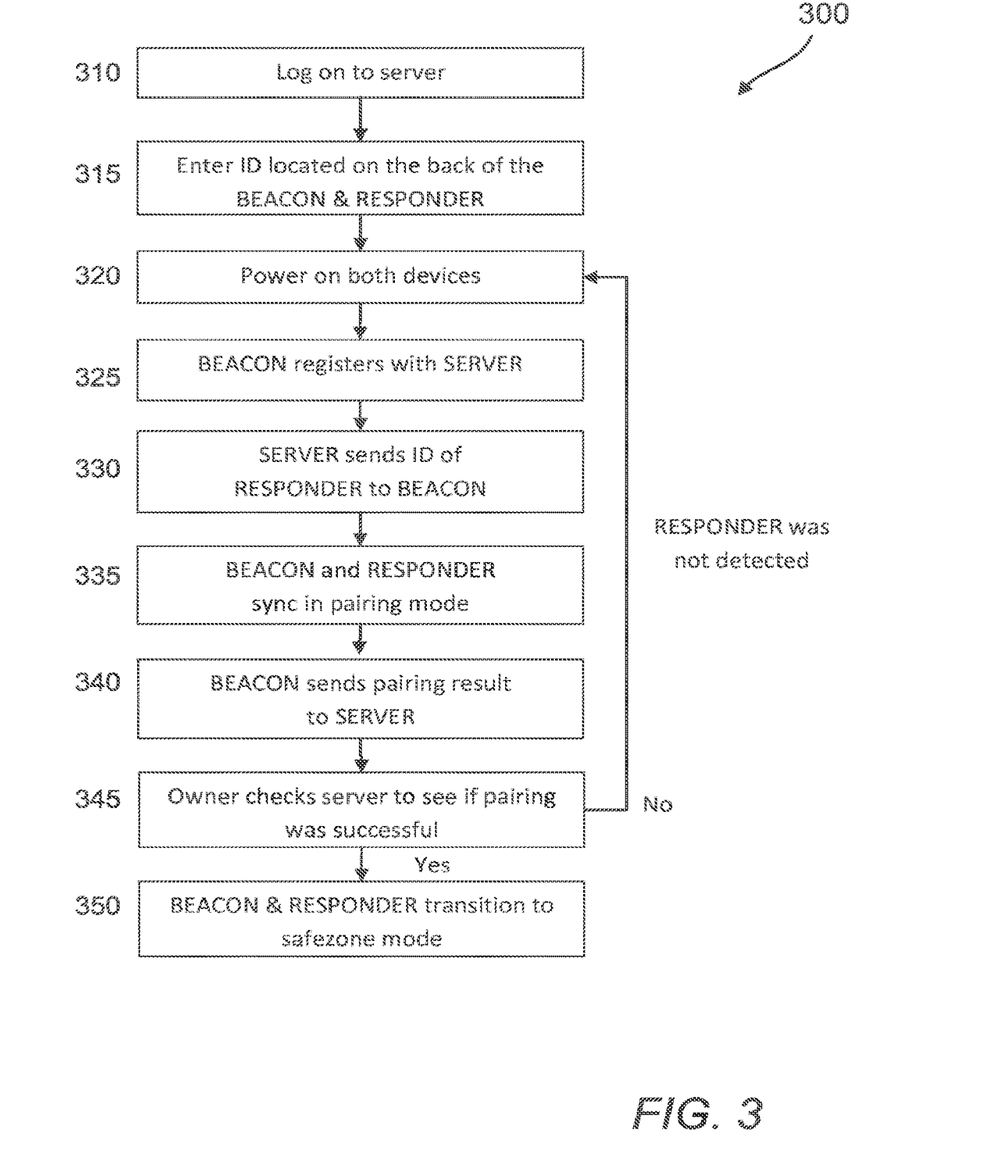
FIG. 3 shows a flow diagram of the steps in the registration and pairing of a beacon and responder in the tracking system in accordance with one embodiment.

FIG. 3 illustrates a registration and pairing process 300 where a beacon having a beacon identifier and a responder having a responder identifier in a tracking system are paired by:
logging onto a server (310), e.g., by a customer using a user interface provided by the server;
entering the beacon identifier and the responder identifier (315);
powering on each of the beacon and the responder (320);
transmitting a message from the beacon to the server including the beacon identifier (325);
receiving a message from the server including the responder identifier (330);
paring and synchronising the beacon with the responder (335);
if paring and synchronising completed, transmitting a message from the beacon to the server including the beacon identifier and the synchronised responder identifier (340);
determining whether a beacon was paired and synchronised with responder, and if not then returning to the step of powering on each of the beacon and the responder else proceeding to next step (345); and
entering safe zone monitoring mode and the beacon polling the paired responder (350).

The registration and pairing process in one embodiment also includes initially creating an account and associating responder and beacon identifiers with the account so entering the beacon identifier and the responder identifier can be streamlined by selecting identifiers from a drop-down list or a checkbox list. The beacon and responder identifies are unique for each device and in one embodiment they are printed in a human readable form on each device.

Figure 4:
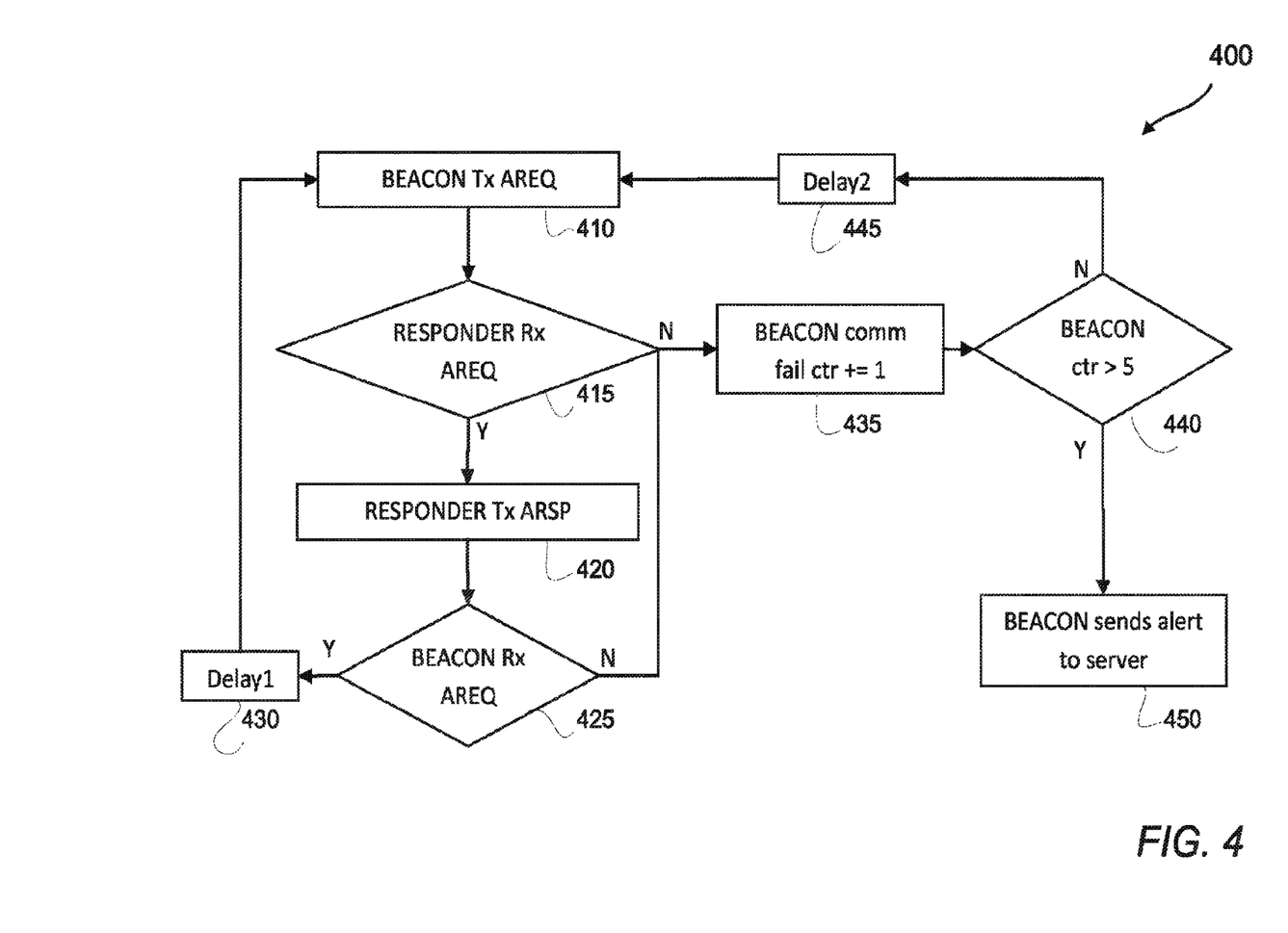
FIG. 4 shows a flow diagram of the steps in safe zone monitoring of a beacon and responder in the tracking system in accordance with one embodiment.

With reference to FIG. 4, steps in safe zone monitoring of a paired beacon and responder 400 in an object tracking system are:
transmitting an authorization request from the beacon to the responder (410);
determining whether the authorization request from the beacon was received by the responder (415);
if the responder received the authorization request from the beacon then transmitting an authentication response from the responder including a polling delay (420);
determining whether the authentication response from the responder was received by the beacon (425);
if the authentication response was received by the beacon then delaying the transmission of the next authentication request from the beacon according to the polling delay(430);
if the responder did not receive the authorization request from the beacon or if the authentication response was not received by the beacon then incrementing a beacon communication failure count (435);
determining whether the beacon communication failure count exceeds the calculated threshold (in this example five successive failures) (440);
if the beacon communication failure count does not exceed the threshold then delaying the transmission of the next authentication request from the beacon for a calculated period (445); and
if the beacon communication failure count exceeds the failure threshold then setting the beacon into automatic alert mode and sending an alert to a central server (450).

In alternative embodiments different successive failure thresholds can be configured and other quantities can be calculated from radio propagation environment measures. For example, in an area with high radio frequency background noise a threshold of 10 successive failures may be optimal. Alternatively, the polling frequency can be increased. In an area with low radio frequency background noise or with sensitive requirements a threshold of 2 successive failures might be optimal.

Figure 5:
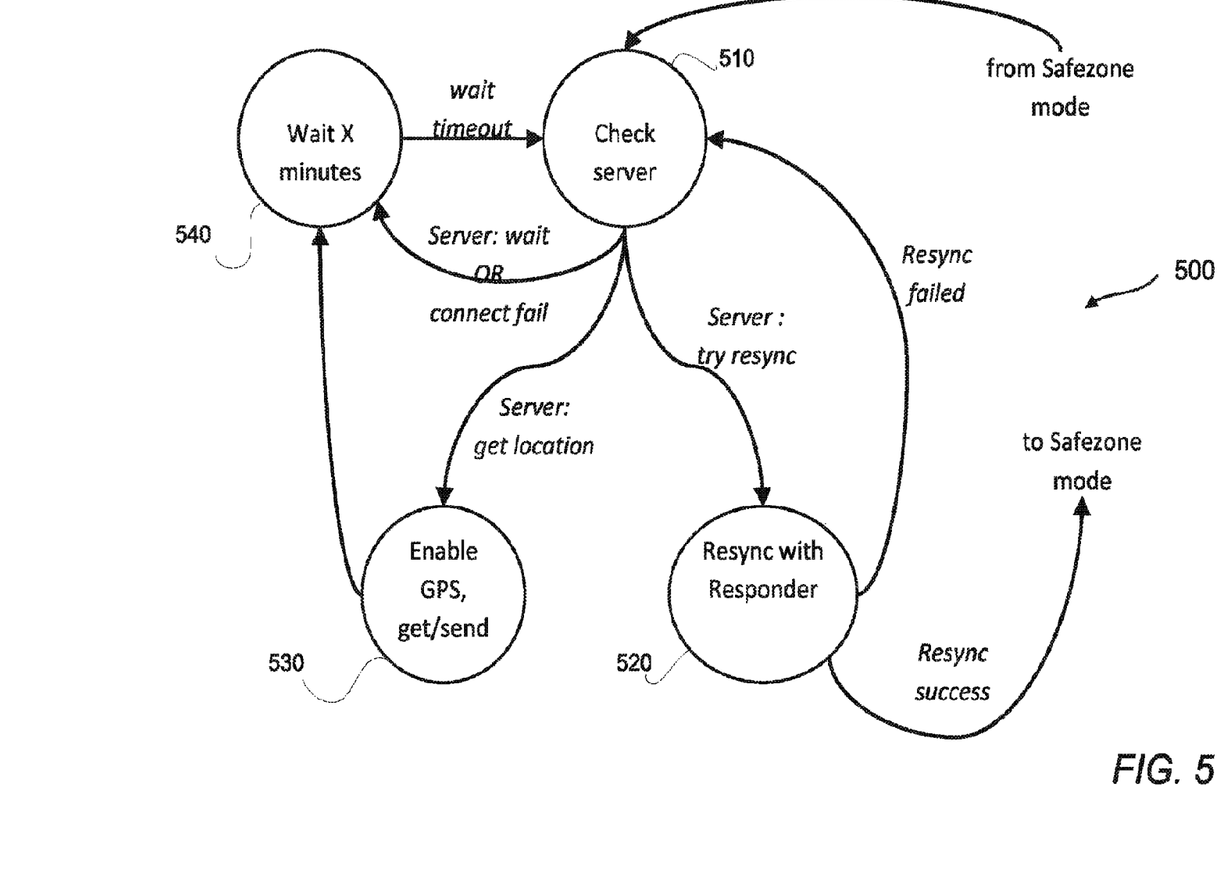
FIG. 5 shows a mode diagram of the tracking system in automatic alert mode in accordance with one embodiment.

With reference to FIG. 5, a mode diagram of a beacon in an object tracking system in automatic alert mode 500 can move between the sub modes of:
check server sub mode (510);
resynchronise with responder sub mode (520);
GPS location determination and position transmission sub mode (530); and
wait sub mode (540).

When the beacon can no longer detect a responder after several attempts to communicate with paired responders it exits the safe zone mode and enters the automatic alert mode 500. The beacon first enters automatic alert mode 500 in the check server sub mode 510.

In the check server sub mode 510, the beacon powers up the wireless communications module and tries to connect to the central server and if this connection is successful an alert message is sent to the central server. The server responds with an action to enter one of the sub modes: resynchronize with responder sub mode 520; GPS location determination and position transmission sub mode 530; or wait sub mode 540.

In the resynchronize with responder sub mode 520, the beacon will transmit its requests to the responder at regular intervals to ensure that the responder is polled with a request during one of its wake cycles. If the synchronization is successful while the beacon is in the resynchronize with responder sub mode 520, the beacon will send a status update to the central server and then return back to safe zone mode. If the synchronization is unsuccessful after a predetermined number of attempts, the beacon returns to the check server sub mode 510. The purpose of having a predetermined number of attempts, for example, five successive alert failures prevents false alerts being issued due to reasons such as packets being corrupted due to noise interference or while changing a battery on a beacon or a responder.

In the GPS location determination and position transmission sub mode 530, the GPS will power up and determine the location before shutting down the GPS and then use the wireless communications network module to transmit the calculated location and the beacon identification and then enter the wait sub mode 540.

In the wait sub mode 540 the beacon is in a low-power state until a predetermined period has elapsed at which time it wakes up and enters check server sub mode 510.

Figure 6A:
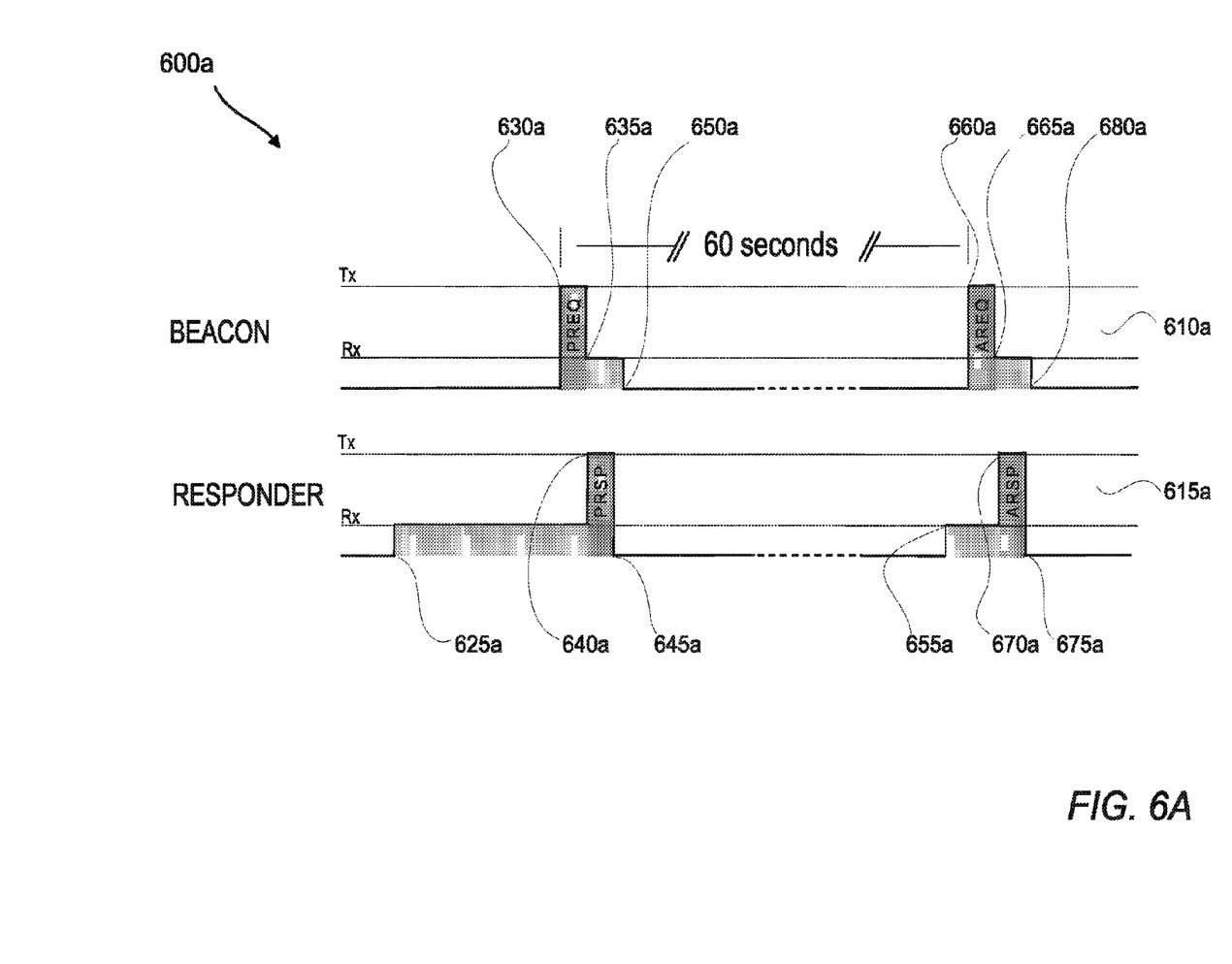
FIG. 6A shows a communication timing diagram of the beacon and responder in pairing mode in accordance with one embodiment.
Figure 6B:
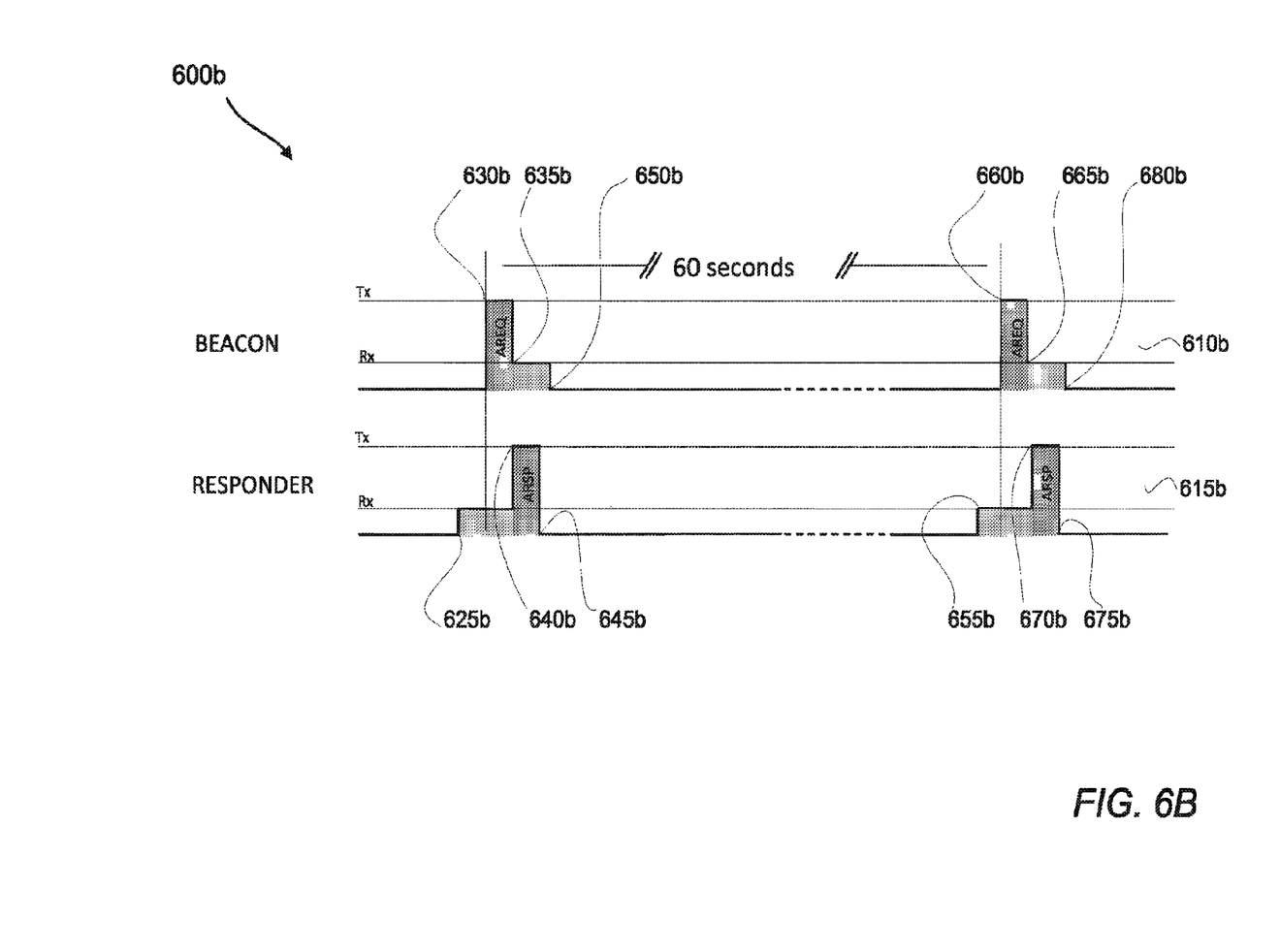
FIG. 6B shows a communication timing diagram of the beacon and responder in safe zone mode in accordance with one embodiment.

With reference to FIGS. 6A and 6B, a communication timing and power diagram of a beacon 610 and a responder 620 in pairing mode and in safe zone mode are respectively shown. The power consumption difference between these two modes is indicated by the difference in the area under the power utilization lines.

One difference between the two modes is the extent of the period that the responder remains in a powered up mode waiting for a transmission from the beacon. Another difference is the type of data packet transmitted. In the pairing mode, the beacon is transmitting a pairing request whereas in the safe zone mode it is sending an authentication request.

The different transmission and reception states in each mode are described sequentially. In each of the modes the responder initially enters a receive state 625 and waits until it receives a pairing transmission 630a or an authentication transmission 630b. The pairing transmission 630a or the authentication transmission 630b is transmitted by the beacon after which the beacon enters a receive state 635. After the responder receives the pairing transmission 630a or the authentication transmission 630b it transmits a pairing transmission 640a or an authentication transmission 640b respectively and then enters a sleep state 645 for a predetermined responder sleep period, 60 seconds is use for illustration in FIG. 6A and FIG. 6b. After the beacon receives the pairing transmission 640a or the authentication transmission 640b it then enters a sleep state 650 for a predetermined beacon sleep period such as, for example, 60 seconds is use for illustration in FIG. 6A and FIG. 6b.

The responder sleep period ends when the responder enters a receive state 655. The responder sleep period is determined such that it wakes up before the beacon comes out of the beacon sleep period and takes into account the relative time drift that can occur between the beacon and the responder. This drift is dependent on the frequency of the processor on each device and other effects including temperature and battery voltage.

The beacon sleep period ends when the beacon enters an authentication transmission state 660. Irrespective of if the previous transmission was the pairing transmission 630a or the authentication transmission 630b, the transmission is an authentication transmission 660 if the pairing response from the responder that was sent in the transmission state 640a was received by the beacon. After transmitting the authentication transmission the beacon enters a receive state 665; the responder receives the beacon authentication request and enters a authentication response state 670 and transmits an authentication response and then enters a further responder sleep state 675; and the beacon receives the authentication response and enters a further beacon sleep state 680, 60 seconds is use for illustration in FIG. 6A and FIG. 6b. This cycle of responder activation and beacon activation continues while ever the beacon stays in the safe zone for the responder.

Other sleep state durations such may be suitable for various use scenarios and the sleep duration may be reconfigured during system operation to accommodate changes in the radio propagation environment and to maximize battery life.

Figure 7:
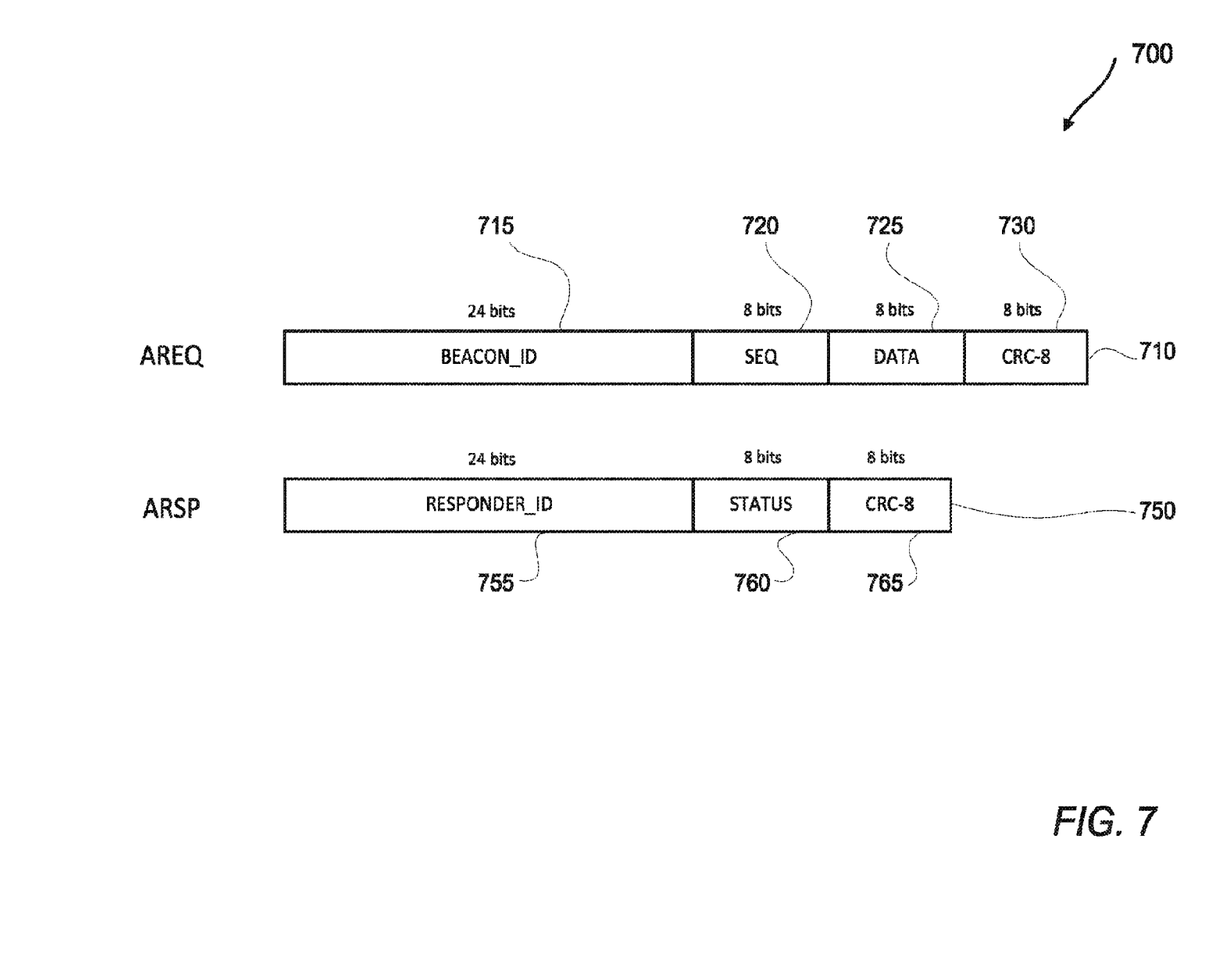
FIG. 7 shows a communication packet structure diagram of the request and response packets between the beacon and the responder in accordance with one embodiment.

With reference to FIG. 7, an example communication packet structure 700 for an authentication request packet 710 that is sent from a beacon includes a 24 bit beacon identifier 715; an 8-bit sequencer identifier 720, an 8-bit data segment 725 and an 8-bit checksum 730. An example communication packet structure 700 for an authentication response packet includes a 24-bit responder identifier 755; an 8-bit status code 760; and an 8-bit checksum 765. The status code 760 can also include a beacon synchronization message so that the responder can control the timing of the transmissions from the beacon. This controlling of timing enables the responder to prevent signal collisions if there are multiple beacons associated with the responder. The status code 760 can also include any other relevant information such as a manual alert request from the responder or a low battery alert on the responder. The data segment 725 from the beacon can be extended to include a beacon identifier and a responder identifier so that the responder can determine if it is to respond and to which beacon it is responding. The status code 760 from the responder can be extended to include the responder identifier and the beacon identifier.

Figure 8:
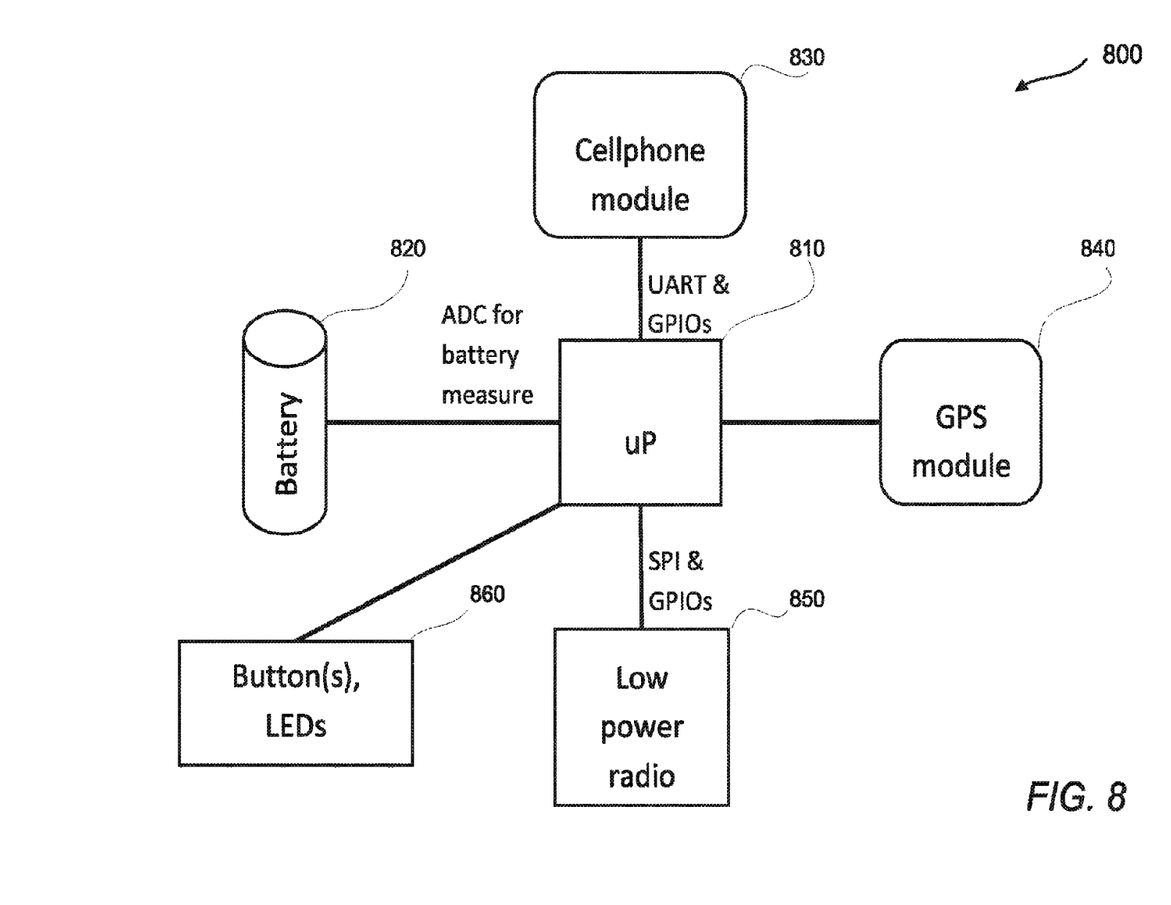
FIG. 8 shows a block diagram of the beacon device in accordance with one embodiment.

With reference to FIG. 8, a block diagram of a beacon device 800 includes a microprocessor 810 powered by a battery 820. The microprocessor 810 is in communication with a wireless communications system module, for example a cellular module 830; a GPS module 840; and a low-power radio 850. The microprocessor 810 also has a user interface 860 on which it controls indicator LEDs or a digital display and receive signals from one or more user input devices for example buttons.

Figure 9:
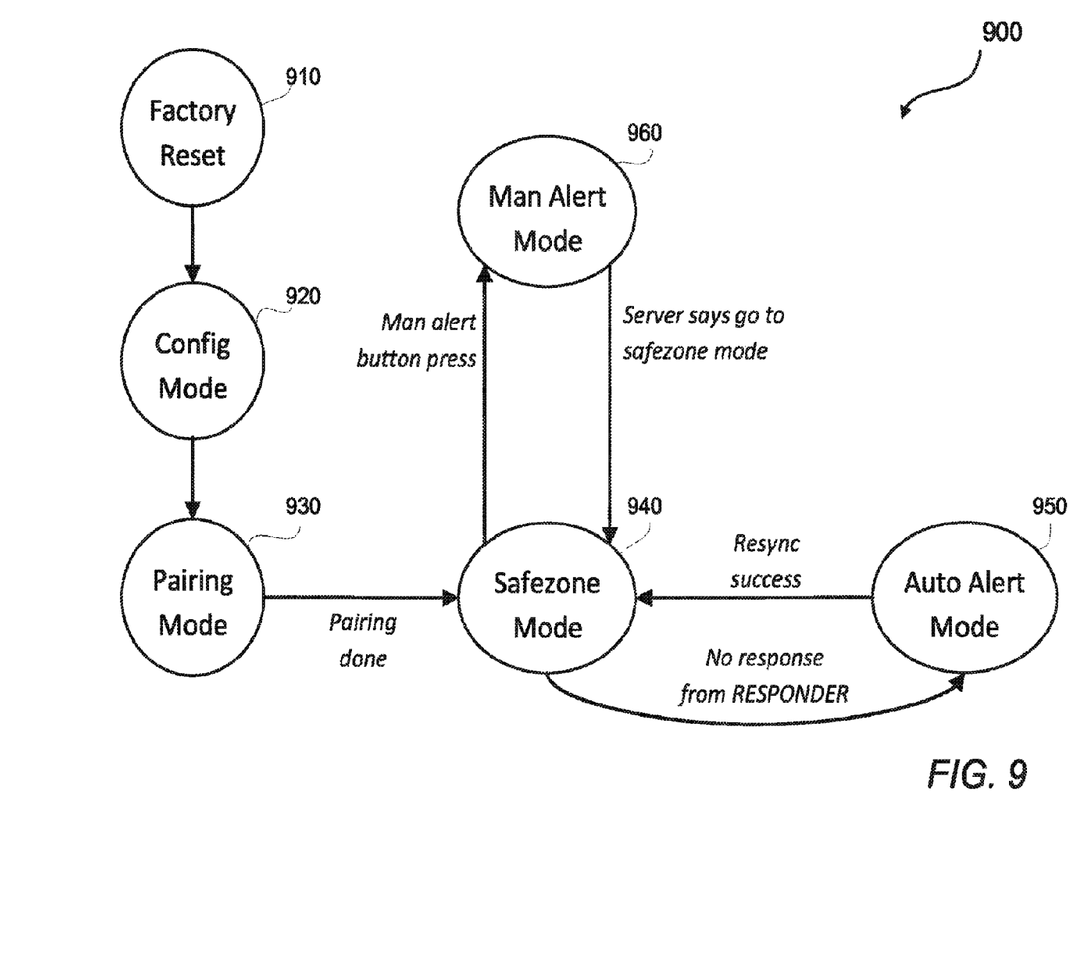
FIG. 9 shows a mode diagram of the beacon moving between operation modes in the tracking system in accordance with one embodiment.

With reference to FIG. 9, a beacon is operable to move between several different modes of operation:
- a factory reset mode (910);
- a configuration mode (920);
- a pairing mode (930);
- a safe zone mode (940);
- an auto alert mode (950); and
- a manual alert mode (960).

The beacon is shipped in one embodiment in the factory reset mode 910. The beacon enters the configuration mode 920 after a button on the beacon is held down for a predetermined period such as 10 seconds. While in the configuration mode the beacon communicates with a central server to receive a beacon configuration including one or more responder identifiers that the beacon has been associated with. After receiving the beacon configuration, the beacon enters the pairing mode 930 and attempts to pair with each of the responders provided by the beacon configuration. If the beacon can pair with each of the responders in the beacon configuration that are flagged as new responders for pairing it will enter the safe zone mode 940.

If at any stage the beacon cannot communicate with at least one responder provided by the beacon configuration and paired with the beacon, then the beacon will enter an auto alert mode 950. While in the auto alert mode 950, if the beacon can re-synchronize with at least one of the responders provided by the beacon configuration then the beacon will return to safe zone mode 940. If at any time the button on the beacon is held down for less than the predetermined period then the beacon enters the manual alert mode 960. The beacon switches from manual alert mode 960 back to safe zone alert mode 940 if the beacon can communicate with the responder and it has received an instruction from the server to return back to safe zone mode 940.

Figure 10:
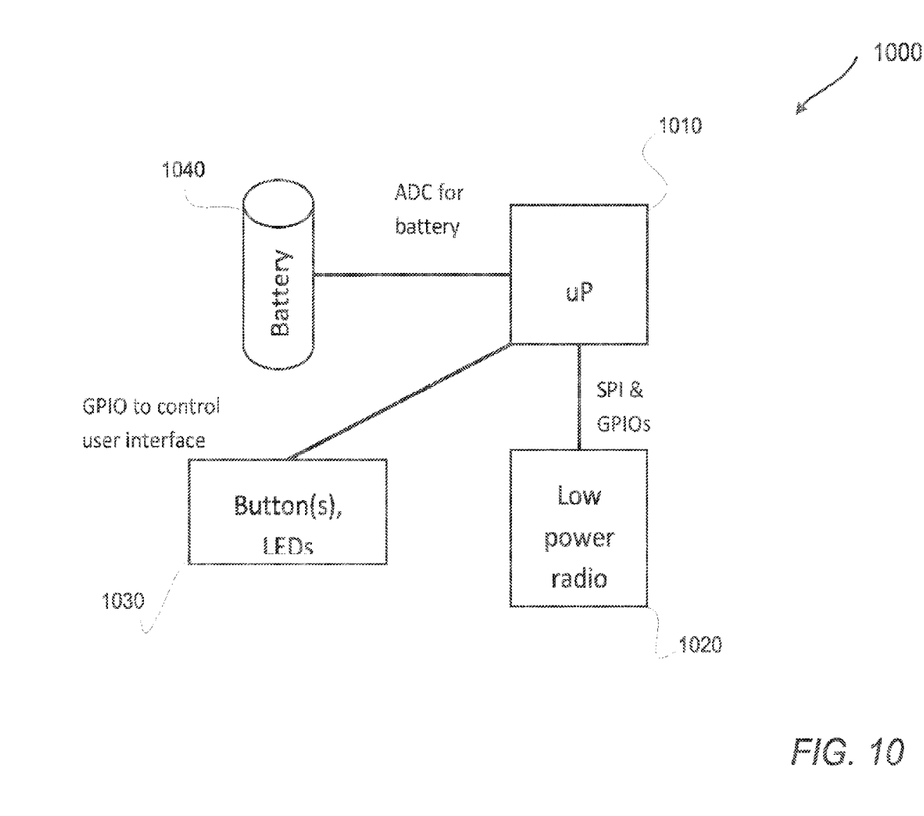
FIG. 10 shows a block diagram of the responder device in accordance with one embodiment.

With reference to FIG. 10, a block diagram of a responder 1000 includes a microprocessor 1010 in communication with a low power radio 1020; a user interface 1030 on which it controls indicator LEDs or a digital display and receive signals from one or more device buttons; and the responder 1000 being powered by a battery 1040. If the responder 1000 does not receive any signal for an extended duration, it can enter a sleep mode until reactivated using the interface 1030.

References to "one embodiment", "an embodiment", "example embodiment", "various embodiments", etc., may indicate that the embodiment(s) of the invention so described may include a particular feature, structure, or characteristic, but not every embodiment necessarily includes the particular feature, structure, or characteristic. Further, repeated use of the phrase "in one embodiment" or "in an exemplary embodiment", do not necessarily refer to the same embodiment, although they may.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supported by this application and the claims equivalents rather than the foregoing description.

For example instead of position determination being performed by calculating position using a GPS network—it could use a SIM based method utilizing cellular network identifier, round trip time and signal strength; a hybrid method such as assisted GPS; or a device based method such as network-based techniques that use the cellular network providers infrastructure to identify the location of the cellular device.

What is claimed is:

1. A method for tracking an object, the method comprising:
    associating a beacon with a plurality of responders, the plurality of responders comprising at least a first fixed position responder defining a first safe zone, a second fixed position responder defining a second safe zone which does not overlap with the first safe zone, and a mobile responder;
    transmitting, by the beacon, a first polling signal;
    receiving, by the beacon, a response from at least one of the plurality of responders to the first polling signal;
    entering a low power state on the beacon for a predetermined duration;
    transmitting a second polling signal from the beacon; and
    responsive to a failure to receive a response from any of the plurality of responders to the second polling signal, transmitting an alert from the beacon to a server.

2. The method of claim 1, wherein the alert indicates a location of the beacon.

3. The method of claim 1, wherein the first polling signal and the second polling signal include a beacon identifier and the response includes a responder identifier of a responder from which the response was received, the beacon identifier and a beacon synchronization message.

4. The method of claim 1, wherein the second polling signal is transmitted responsive to the beacon exiting the low power state.

5. The method of claim 1, wherein associating the beacon with the plurality of responders comprises receiving a message, by the beacon via a communication network, that includes an instruction to associate the beacon with the responders.

6. The method of claim 1, wherein the response to the first polling signal includes a beacon synchronization message and a start time for entering the low power state, the duration determined based on the beacon synchronization message.

7. A computer program product stored on a non-transitory computer program product stored on a non-transitory computer readable storage medium including instructions that when executed cause one or more processors to perform steps comprising:
    associating a beacon with a plurality of responders, the plurality of responders comprising at least a first fixed position responder defining a first safe zone, a second fixed position responder defining a second safe zone which does not overlap with the first safe zone, and a mobile responder;
    transmitting, by the beacon, a first polling signal;
    receiving, by the beacon, a response from at least one of the plurality of responders to the first polling signal;
    entering a low power state on the beacon for a predetermined duration;
    transmitting a second polling signal from the beacon; and
    responsive to a failure to receive a response from any of the plurality of responders to the second polling signal, transmitting an alert from the beacon to a server.

8. The computer program product of claim 7, wherein the alert indicates a location of the beacon.

9. The computer program product of claim 7, wherein the first polling signal and the second polling signal include a beacon identifier and the response includes a responder identifier of a responder from which the response was received, the beacon identifier and a beacon synchronization message.

10. The computer program product of claim 7, wherein the second polling signal is transmitted responsive to the beacon exiting the low power state.

11. The computer program product of claim 7, wherein associating the beacon with the plurality of responders comprises receiving a message, by the beacon via a communication network, that includes an instruction to associate the beacon with the responders.

12. The computer program product of claim 7, wherein the response to the first polling signal includes a beacon synchronization message and a start time for entering the low power state, the duration determined based on the beacon synchronization message.

13. A beacon comprising:
one or more computer processors; and
a non-transitory computer readable storage medium including instructions that when executed cause the one or more processors to perform steps comprising:
associating the beacon with a plurality of responders, the plurality of responders comprising at least a first fixed position responder defining a first safe zone, a second fixed position responder defining a second safe zone which does not overlap with the first safe zone, and a mobile responder;
transmitting a first polling signal;
receiving a response from at least one of the plurality of responders to the first polling signal;
entering a low power state for a predetermined duration;
transmitting a second polling signal; and
responsive to a failure to receive a response from any of the plurality of responders to the second polling signal, transmitting an alert to a server.

14. The beacon of claim 13, wherein the alert indicates a location of the beacon.

15. The beacon of claim 13, wherein the first polling signal and the second polling signal include a beacon identifier and the response includes a responder identifier of a responder from which the response was received, the beacon identifier and a beacon synchronization message.

16. The beacon of claim 13, wherein the second polling signal is transmitted responsive to the beacon exiting the low power state.

17. The beacon of claim 13, wherein the response to the first polling signal includes a beacon synchronization message and a start time for entering the low power state, the duration determined based on the beacon synchronization message.

* * * * *